United States Patent
Yu et al.

(10) Patent No.: US 8,843,150 B2
(45) Date of Patent: Sep. 23, 2014

(54) BEAMFORMING METHOD AND APPARATUS FOR ACQUIRING TRANSMISSION BEAM DIVERSITY IN A WIRELESS COMMUNICATION SYSTEM

(71) Applicant: Samsung Electronics Co. Ltd., Suwon-si (KR)

(72) Inventors: Hyun-Kyu Yu, Yongin-si (KR); Tae-Young Kim, Seongnam-si (KR); Ji-Yun Seol, Seongnam-si (KR); Su-Ryong Jeong, Yongin-si (KR); Jeong-Ho Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/729,807

(22) Filed: Dec. 28, 2012

(65) Prior Publication Data

US 2013/0172002 A1 Jul. 4, 2013

(30) Foreign Application Priority Data

Dec. 28, 2011 (KR) .......................... 10-2011-0144858

(51) Int. Cl.
*H04W 72/04* (2009.01)
*H04B 7/06* (2006.01)
*H04L 1/06* (2006.01)

(52) U.S. Cl.
CPC ............. *H04W 72/046* (2013.01); *H04B 7/068* (2013.01); *H04B 7/0617* (2013.01); *H04B 7/0695* (2013.01); *H04B 7/0619* (2013.01); *H04B 7/0669* (2013.01); *H04L 1/0668* (2013.01)
USPC ......................... 455/452.1; 370/334; 375/267

(58) Field of Classification Search
CPC ... H04W 72/082; H04W 76/02; H04W 16/28; H04W 1/707; H04L 1/0618
USPC .......... 455/452.1, 69, 450; 375/267; 370/334, 370/335

See application file for complete search history.

(56) References Cited

U.S. PATENT DOCUMENTS

| | | | |
|---|---|---|---|
| 2005/0047517 A1* | 3/2005 | Georgios et al. | ............... 375/267 |
| 2006/0239374 A1 | 10/2006 | Aldana et al. | |
| 2007/0099578 A1* | 5/2007 | Adeney et al. | .................. 455/69 |
| 2009/0296788 A1 | 12/2009 | Hottinen | |
| 2010/0189189 A1 | 7/2010 | Hoshino et al. | |
| 2010/0238824 A1 | 9/2010 | Farajidana et al. | |

FOREIGN PATENT DOCUMENTS

WO 01/78254 A1 10/2001

\* cited by examiner

*Primary Examiner* — Phuoc H Doan
(74) *Attorney, Agent, or Firm* — Jefferson IP Law, LLP (57) ABSTRACT

A data transmission method for a base station to acquire transmission beam diversity in a wireless communication system is provided. The data transmission method includes selecting at least two transmission beams to be used for data transmission from among multiple transmission beams corresponding to transmission beam information, if receiving the transmission beam information regarding the multiple transmission beams from a terminal, and transmitting data encoded with a predetermined orthogonalization code to the terminal via the selected at least two transmission beams.

28 Claims, 9 Drawing Sheets

BEAMFORMING METHOD AND APPARATUS FOR ACQUIRING TRANSMISSION BEAM DIVERSITY IN A WIRELESS COMMUNICATION SYSTEM

PRIORITY

This application claims the benefit under 35 U.S.C. §119(a) of a Korean patent application filed on Dec. 28, 2011 in the Korean Intellectual Property Office and assigned Serial No. 10-2011-0144858, the entire disclosure of which is hereby incorporated by reference.

BACKGROUND OF THE INVENTION

1. Field of the Invention

The present invention relates to a wireless communication system. More particularly, the present invention relates to a beamforming method and apparatus for acquiring transmission beam diversity in a wireless communication system.

2. Description of the Related Art

To meet the ever-increasing demand for wireless data traffic, wireless communication systems have evolved to support higher data rates. Recently commercialized 4th-Generation (4G) communication systems have been developed mainly toward spectral efficiency improvement to increase data rates. However, the explosively increasing wireless data traffic demand is difficult to meet merely with spectral efficiency improvement.

Accordingly, to meet the recent explosively-increasing wireless data traffic demand, research has been actively conducted on the use of broad frequency bands. At present, frequency bands used in mobile communication cellular systems are generally lower than 100 GHz, in which it is difficult to secure broadband frequencies. For this reason, a need exists to secure broadband frequencies in higher frequency bands. However, as the frequency band for wireless communication becomes higher, a propagation path loss increases, reducing a wave reaching distance and also a coverage.

To address these issues, beamforming has been on the rise as a key technique for alleviating a propagation path loss and increasing a wave reaching distance. The beamforming technique typically needs a beam selection technique for accurately measuring transmission and reception beams and for selecting and reporting the most proper beam at a base station and a terminal, respectively. However, an obstacle between the base station and the terminal or mobility of the terminal may cause a beam change which is difficult to catch up merely with the beam selection technique. Therefore, a need exists for a transmission method which is robust against a beam change.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a beamforming method and apparatus for acquiring transmission beam diversity in a wireless communication system.

In accordance with an aspect of the present invention, a data transmission method for a base station to acquire transmission beam diversity in a wireless communication system is provided. The data transmission method includes selecting at least two transmission beams to be used for data transmission from among multiple transmission beams corresponding to transmission beam information, if receiving the transmission beam information regarding the multiple transmission beams from a terminal, and transmitting data encoded with a predetermined orthogonalization code to the terminal by using the via selected at least two transmission beams.

In accordance with another aspect of the present invention, a data reception method for a terminal to acquire transmission beam diversity in a wireless communication system is provided. The data reception method includes transmitting transmission beam information regarding multiple transmission beams to a base station and receiving data, which is encoded with a predetermined orthogonalization code and transmitted using at least two transmission beams among the multiple transmission beams, from the base station.

In accordance with another aspect of the present invention, a data transmission method for a terminal to acquire transmission beam diversity in a wireless communication system is provided. The data transmission method includes receiving information on at least two transmission beam to be used for data transmission from a base station and transmitting data encoded with a predetermined orthogonalization code to the base station via the at least two transmission beam.

In accordance with another aspect of the present invention, a data reception method for a base station to acquire transmission beam diversity in a wireless communication system is provided. The data reception method includes selecting at least two transmission beams to be used for data transmission from among multiple transmission beams, transmitting information regarding the selected transmission beams, and receiving data which is encoded with a predetermined orthogonalization code and transmitted via the at least two transmission beams.

In accordance with another aspect of the present invention, a base station for acquiring transmission beam diversity in a wireless communication system is provided. The base station includes a receiver for receiving transmission beam information regarding multiple transmission beams from a terminal, a controller for selecting at least two transmission beams to be used for data transmission from among the multiple transmission beams corresponding to the transmission beam information, and a transmitter for transmitting data encoded with a predetermined orthogonalization code to the terminal via the selected at least two transmission beams.

In accordance with another aspect of the present invention, a terminal for acquiring transmission beam diversity in a wireless communication system is provided. The terminal includes a transmitter for transmitting transmission beam information regarding multiple transmission beams to a base station and a receiver for receiving data, which is encoded with a predetermined orthogonalization code and transmitted via at least two transmission beams among the multiple transmission beams, from the base station.

In accordance with another aspect of the present invention, a terminal for acquiring transmission beam diversity in a wireless communication system is provided. The terminal includes a receiver for receiving at least two transmission beam information to be used for data transmission from a base station and a transmitter for transmitting data encoded with a predetermined orthogonalization code to the base station via the at least two transmission beams.

In accordance with another aspect of the present invention, a base station for acquiring transmission beam diversity in a wireless communication system is provided. The base station includes a controller for selecting at least two transmission beams to be used for data transmission from among multiple transmission beams, a transmitter for transmitting information regarding the selected transmission beams to a terminal, and a receiver for receiving data which is encoded with a predetermined orthogonalization code and transmitted via the at least two transmission beams.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF THE EXEMPLARY EMBODIMENTS

The following description with reference to the accompanying drawings is provided to assist in a comprehensive understanding of exemplary embodiment of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, a description will be made of a beamforming method and apparatus for acquiring transmission beam diversity in a wireless communication system. Exemplary embodiments of the present invention are applicable to both an UpLink (UL) and a DownLink (DL), but in the following description, for brevity, application to the DL will be described.

Before undertaking description of the present invention, a beamforming technique will be described in detail. Beamforming may be classified into transmission beamforming performed at a transmission end and reception beamforming performed at a reception end.

The transmission beamforming focuses a reaching area of electric waves in a particular direction by using multiple antennas to increase directivity, such that few signals are transmitted in directions other than the directed direction, thereby largely reducing signal interference. A group of multiple antennas may be referred to as an antenna array, and each antenna included in the antenna array may be referred to as an array element. The antenna array may be arrays in various shapes, for example, a linear array and a planar array.

The reception end may perform beamforming with respect to a received signal by using a reception antenna array. The reception beamforming focuses reception of electric waves in a particular direction to increase reception sensitivity of signals introduced in the direction, and excludes signals introduced in other directions than the particular direction from received signals, thereby providing the gain of blocking an interference signal.

In the following description, it should be noted that transmission beam diversity is defined as a method for simultaneously transmitting signals by using multiple transmission beams to transmit single data in at least one antenna array.

Figure 1:
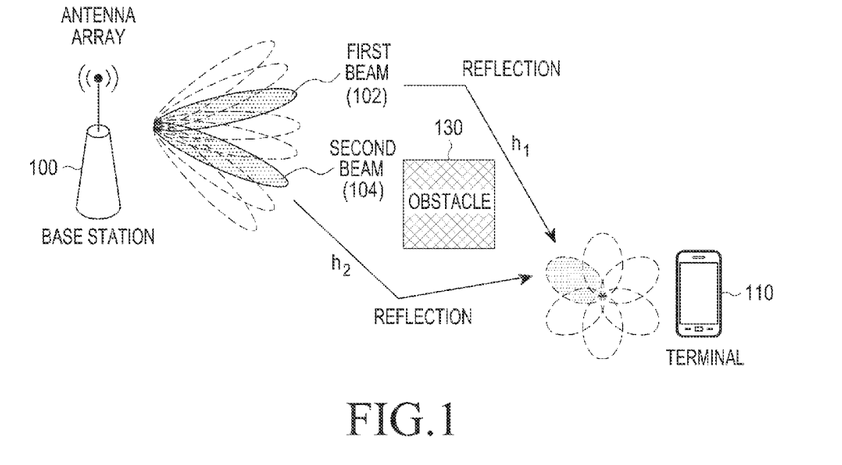
FIG. 1 is a diagram illustrating a transmission beam diversity transmission scheme according to an exemplary embodiment of the present invention.

FIG. 1 is a diagram illustrating a transmission beam diversity transmission scheme according to an exemplary embodiment of the present invention.

Referring to FIG. 1, a base station 100, when transmitting a DL signal to a terminal 110, generates and transmits two transmission beams, for example, a first beam 102 and a second beam 104, in one antenna array. The first beam 102 and the second beam 104 refer to beams which are selected by the base station 100 out of beams having good channel states among beams generated in the one antenna array.

Instantly, one beam may exist which has the best channel state, but in a variant channel, reception power for each beam continuously changes. In scheduling, there may be no way to know an instant channel state of a beam. As a result, in communication through two channel links respectively formed by the first and second beams 102 and 104, a corresponding diversity gain might not be obtained. Moreover, even if the channel link of one of the two beams, for example, the first beam 102 sharply degrades due to an obstacle 130 occurring due to movement of the terminal 110, communication may be maintained through the other beam, for example, the second beam 104.

In addition, if signals transmitted using multiple transmission beams can be received without being mixed at a reception end, the base station 100 may obtain a transmission beam diversity gain by simultaneously transmitting the signals using the multiple transmission beams, and the terminal 100 may also obtain a Maximum Ratio Combining (MRC) gain.

For example, it is assumed that the base station 100 transmits signals by using an $m^{th}$ transmission beam and an $n^{th}$ transmission beam, and the terminal 110 receives the $m^{th}$ transmission beam signal through a $P^{th}$ reception beam and receives the $n^{th}$ transmission beam signal through a $q^{th}$ reception beam. It is also assumed that the $m^{th}$ transmission beam signal is not received through the $q^{th}$ reception beam and the $n^{th}$ transmission beam signal is not received through the $P^{th}$ reception beam. In this case, the base station 100 may obtain a transmission beam diversity gain by simultaneously transmitting signals by using the $m^{th}$ transmission beam and the $n^{th}$ transmission beam, respectively, and the terminal 110 may easily apply MRC to the received $m^{th}$ transmission beam signal and $n^{th}$ transmission beam signal.

However, if signals transmitted through multiple transmission beams are received in a mixed manner, (i.e., channel links generated by the multiple transmission beams interfere with each other), then it may be difficult for the terminal 110 to apply MRC to the transmission beam signals.

For example, it is assumed that the base station 100 transmits signals by using the $m^{th}$ transmission beam and the $n^{th}$ transmission beam, and the terminal 110 receives the $m^{th}$ transmission beam signal through the $P^{th}$ reception beam and receives the $n^{th}$ transmission beam signal through the $q^{th}$ reception beam. It is assumed that the most appropriate reception beams for the $m^{th}$ transmission beam and the $n^{th}$ transmission beam are the same as each other. In this case, the transmission beam signals are received in such a way that the channel links generated by the transmission beams are mixed, and thus it may be difficult for the terminal 110 to apply MRC to the transmission beam signals, reducing a corresponding MRC gain.

Accordingly, a need exists for a scheme for separating a plurality of transmission beam signals when the plurality of transmission beam signals are transmitted. An exemplary embodiment of the present invention considers an encoding scheme which enables orthogonalization between the transmission beam signals. An exemplary embodiment of the present invention also considers, as the encoding scheme, an Alamouti scheme, for example, a Space-Time Block Code (STBC) scheme or a Space-Frequency Block Code (SFBC) scheme.

Figure 2:
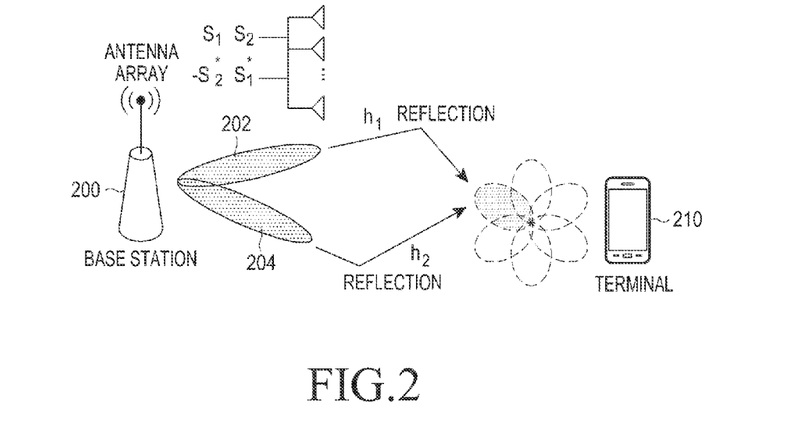
FIG. 2 is a diagram illustrating a transmission beam diversity transmission scheme according to an exemplary embodiment of the present invention.

FIG. 2 is a diagram illustrating a transmission beam diversity transmission scheme according to an exemplary embodiment of the present invention.

Referring to FIG. 2, a base station 200 uses two transmission beams, such as a first beam 202 and a second beam 204, and transmits signals encoded with the Alamouti scheme through the first beam 202 and the second beam 204, respectively. The base station 200 transmits the encoded signals along a beam axis and a time axis or a beam axis and a frequency axis, according to a transmission beam direction, and the terminal 210 receives the first beam signal and the second beam signal in one reception beam direction.

Equation 1 expresses a reception beam signal received by the terminal 210.

$$[r_1 \ r_2] = [h_1 \ h_2] \begin{bmatrix} S_1 & -S_2^* \\ S_2 & S_1^* \end{bmatrix} + [n_1 \ n_2], \quad (1)$$

In Equation 1, $r_1$ and $r_2$ indicate reception signals received by a terminal, $h_1$ and $h_2$ indicate channels of the first beam 202 and the second beam 204 to which precoding is applied, $n_1$ and $n_2$ indicate white noise, subscripts of r and n indicate resource indices of a time axis or a frequency axis, and a subscript of h indicates a beam axis index.

The terminal 210 may apply MRC to transmission beam signals through a simple decoding procedure expressed as in Equation 2 and Equation 3.

$$(|h_1|^2+|h_2|^2)S_1 = h_1^* r_1 + h_2 r_2^* \quad (2)$$

$$(|h_1|^2+|h_2|^2)S_2 = -h_2 r_1^* + h_1^* r_2 \quad (3)$$

Equation 2 is an equation for calculating the first transmission symbol, and Equation 3 is an equation for calculating the second transmission symbol. In Equation 2 and Equation 3, S1 and S2 indicate transmission symbols transmitted using beamforming, and a subscript of S indicates a symbol index.

Performance of transmission beam diversity transmission may vary with the degree of correlation between channel links formed by respective beams at the reception end or a channel size formed by a beam, such that the base station may determine whether to perform transmission beam diversity transmission based on information fed back from the terminal.

For reference, transmission antenna diversity according to the related art acquires gain based on an independent channel of each antenna, whereas transmission beam diversity acquires a gain based on an independent channel of each beam formed by multiple antennas or elements. Accordingly, when an orthogonalization code is applied to transmission antenna diversity as in the Alamouti scheme, different symbols for different antennas are transmitted, whereas when the orthogonalization code is applied to transmission beam diversity, different symbols are separately transmitted through different beams for each of multiple antenna elements.

Figure 3:
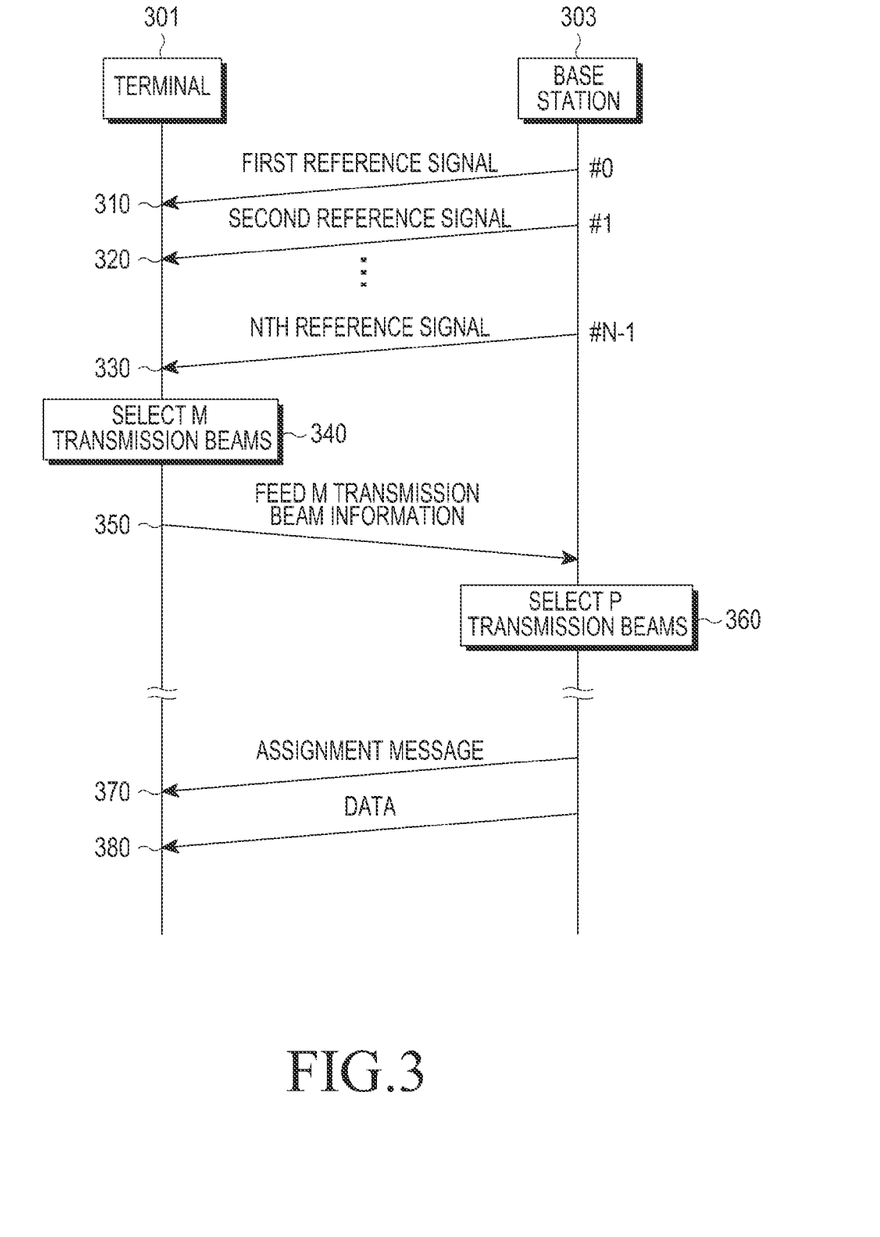
FIG. 3 is a diagram illustrating a transmission beam diversity transmission procedure between a terminal and a base station according to a first exemplary embodiment of the present invention.

FIG. 3 is a diagram illustrating a transmission beam diversity transmission procedure between a terminal and a base station according to a first exemplary embodiment of the present invention.

Referring to FIG. 3, a base station 303 transmits first through $N^{th}$ DL reference signals corresponding to transmission beams #0 through #(N−1) to a terminal 301 in steps 310 through 330, and the terminal 301 selects M most appropriate transmission beams from among N transmission beams by using the received DL reference signals in step 340. The most appropriate transmission beams may be selected, for example, in an order from the best link channel state measured based on the DL reference signal to the worst link channel state. The terminal 301 then feeds back information about the selected M transmission beams (or 'M transmission beam information') to the base station 303 in step 350. The transmission beam information may include, for example, a beam index and a beam reception power. When feeding the transmission beam information back to the base station 303, at the request of the base station 303, the terminal 301 may also feed back to the base station, as additional information, at least one of inter-transmission beam correlation information about correlation between transmission beams and reception beam index information about reception beams which are optimally mapped to the selected M transmission beams, respectively, together with the transmission beam information. The feedback interval of the transmission beam information and the feedback interval of the additional information may be the same as or different from each other. Operations in steps 340 and 350 may be performed periodically, but they may not need to be performed prior to transmission of data using transmission beam diversity.

In step 360, the base station 303 selects P (>1) transmission beams to be actually used in data transmission from among the M transmission beams corresponding to the transmission beam information received in step 350 for data transmission using transmission beam diversity. The base station 303 transmits a scheduling assignment message including, for example, information about the selected P transmission beams (or 'P transmission beam information') and resource assignment information to the terminal 301 in step 370, and transmits data encoded using an Alamouti scheme to the terminal 301 by using the P transmission beams selected in step 360 in step 380. The selected P transmission beams are formed from antennas included in an antenna array, and the data encoded using the Alamouti scheme is transmitted through the antennas included in the antenna array.

The base station 303 may use the following conditions to determine transmission beam diversity transmission:

(1) if an inter-transmission beam correlation value is less than a particular value;

(2) if an inter-transmission beam reception power difference is less than a particular value; and (3) if reception beam indices optimally mapped to transmission beams are the same as each other.

The terminal 301 receives the data transmitted in step 380, and decodes the respective reception beams. If a magnitude of a signal transmitted through a particular transmission beam in a particular reception beam is less than a particular value, channel estimation is not possible, such that decoding may be performed on the assumption that no symbol is transmitted from the beam. If the data is received as multiple reception beams, the terminal 301 may combine decoding results from the respective reception beams symbol-by-symbol, or may select and combine at least two results from among multiple results. When only one result is selected, the combining process may not be necessary.

While the transmission beam diversity transmission procedure applied to the DL has been described as an example in FIG. 3, the terminal and the transmission beam diversity transmission procedure described in FIG. 3 may also be applied to an UL.

The transmission beam diversity transmission procedure applied to the UL will be described briefly.

The base station 303 selects the P transmission beams by using the transmission beam information received from the terminal 301 in step 360, and transmits the P transmission beam information to the terminal 301 through the scheduling assignment message in step 370. The terminal 301 transmits the data encoded using the Alamouti scheme to the base station 303 by using the transmission beams indicated by the P transmission beam information included in the scheduling assignment message.

The operation of step 360 may be performed by the base station 303 using the transmission beam information received from the terminal 301 like in the DL, or the base station 303 may perform the operation in step 360 of receiving an UL reference signal, measuring a link channel state, and selecting P transmission beams based on the measurement result.

Figure 4:
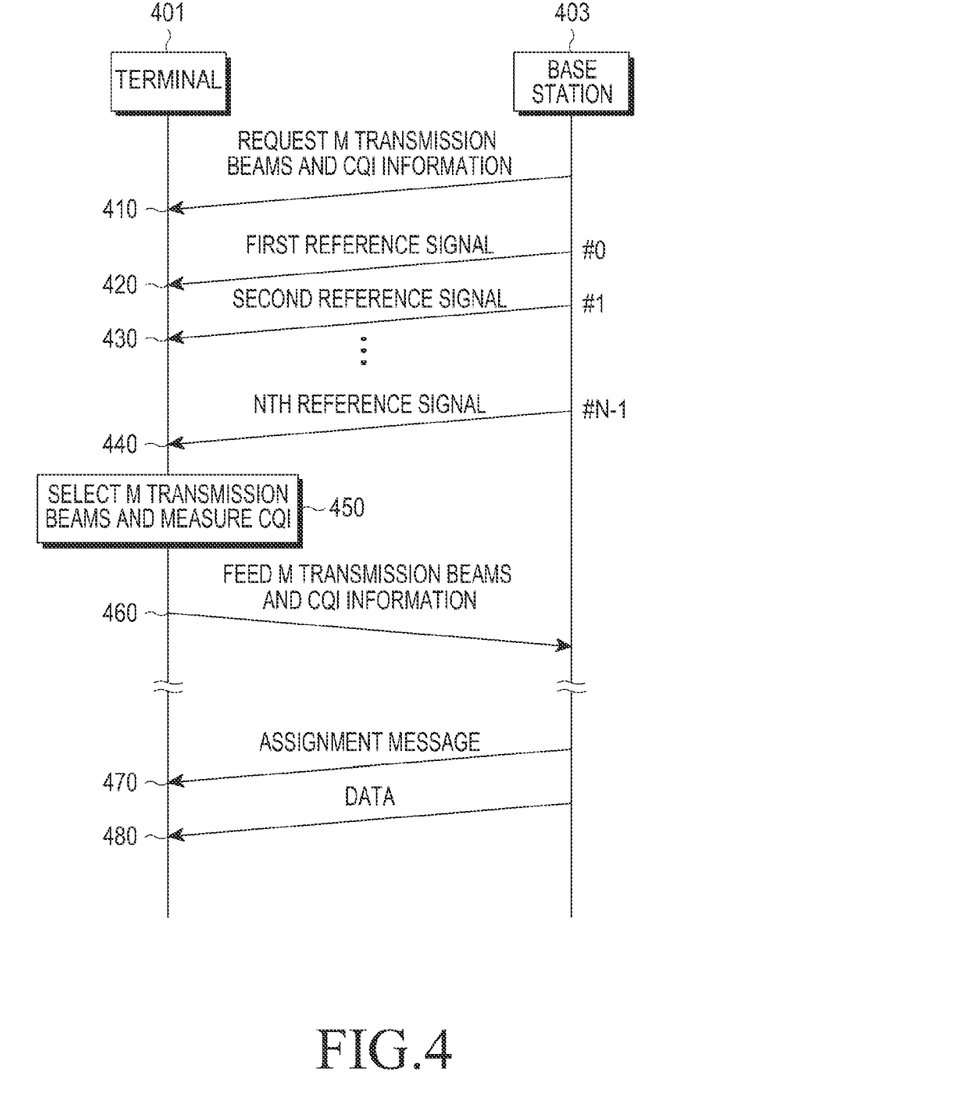
FIG. 4 is a diagram illustrating a transmission beam diversity transmission procedure between a terminal and a base station according to a second exemplary embodiment of the present invention.

FIG. 4 is a diagram illustrating a transmission beam diversity transmission procedure between a terminal and a base station according to a second exemplary embodiment of the present invention.

Referring to FIG. 4, a base station 403 sends a request for M transmission beams which are the most appropriate for a transmission mode for transmission beam diversity acquisition, (i.e., a transmission beam diversity transmission mode), and channel quality information predicted in signal transmission in the transmission beam diversity transmission mode, for example, Channel Quality Indicator (CQI) information, to a terminal 401 in step 410.

The base station 403 transmits first through $N^{th}$ DL reference signals corresponding to transmission beams #0 through #(N−1) to the terminal 401 in steps 420 through 440. The terminal 401 selects M most appropriate transmission beams from among N transmission beams by using the received DL reference signals and measures a CQI predicted in signal transmission in the transmission beam diversity transmission mode by using the M transmission beams in step 450. The most appropriate transmission beams may be selected, for example, in an order from the best link channel state measured based on the DL reference signal to the worst link channel state.

The terminal 401 then feeds the M transmission beam information and the measured CQI information back to the base station 403 in step 460. The transmission beam information may include, for example, a beam index and a beam reception power. At the request of the base station 403, the terminal 401 may select M transmission beams which are appropriate for the transmission beam diversity transmission mode, by using at least one of inter-transmission beam correlation information, an inter-transmission beam reception power difference, and information of whether or not indices of reception beams optimally mapped to transmission beams are the same, at the request of the base station 403, and may feed the M transmission beam information back to the base station 403.

The operations of transmitting, by the base station 403, the DL reference signals in steps 420 through 440 and measuring and feeding back the CQI to the base station, by the terminal 401 in steps 450 and 460 may be periodically performed, and may not need to be performed immediately prior to transmission of data using transmission beam diversity.

The base station 403 transmits a scheduling assignment message including, for example, transmission mode information and resource assignment information to the terminal 401 for data transmission using transmission beam diversity in step 470, and transmits data encoded using an Alamouti scheme to the terminal 401 by using M transmission beams fed back by the terminal 401 in step 480. The M transmission beams are formed from antennas included in an antenna array, and the data encoded using the Alamouti scheme is transmitted through the antennas included in the antenna array.

The terminal 401 receives transmitted data and performs decoding for respective reception beams. If a magnitude of a signal transmitted through a particular transmission beam in a particular reception beam is less than a particular value, channel estimation is not possible, such that decoding may be performed on the assumption that no symbol is transmitted from the beam. If the data is received as multiple reception beams, the terminal 401 may combine decoding results from the respective reception beams symbol-by-symbol, or may select and combine at least two results from among multiple results. When only one result is selected, the combining process may not be necessary.

While the transmission beam diversity transmission procedure applied to the DL has been described as an example in FIG. 4, the terminal and the transmission beam diversity transmission procedure described in FIG. 4 may also be applied to an UL. For UL, the base station 403 transmits the scheduling assignment message including, for example, the transmission mode information and the resource assignment information, to the terminal 401 for data transmission using transmission beam diversity in step 470, and the terminal 401 transmits the data encoded using the Alamouti scheme to the base station 403 by using the M transmission beams selected in step 450.

Figure 5:
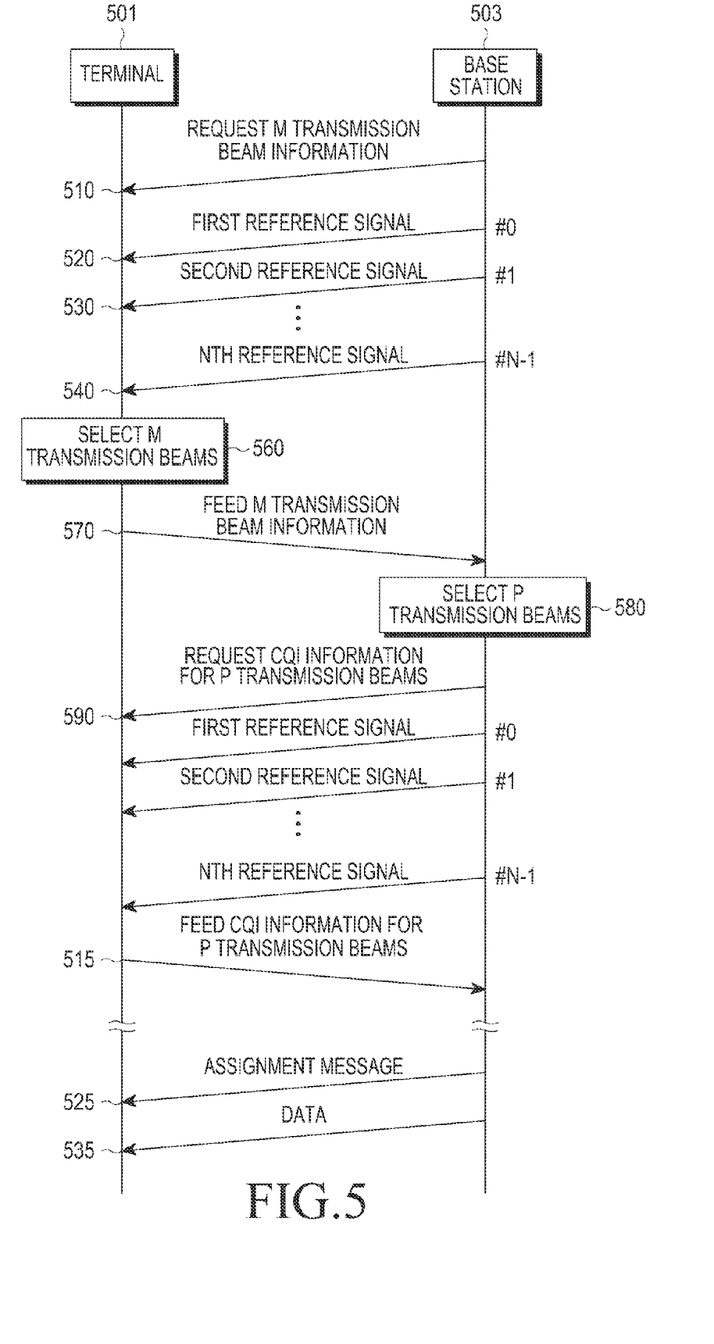
FIG. 5 is a diagram illustrating a transmission beam diversity transmission procedure between a terminal and a base station according to a third exemplary embodiment of the present invention.

FIG. 5 is a diagram illustrating a transmission beam diversity transmission procedure between a terminal and a base station according to a third exemplary embodiment of the present invention.

Referring to FIG. 5, a base station 503 sends a request for information about M transmission beams which are most appropriate for a transmission beam diversity transmission mode to a terminal 501 in step 510. The base station 503 transmits first through $N^{th}$ DL reference signals corresponding to transmission beams #0 through #(N−1) to the terminal 501 in steps 520 through 540. The terminal 501 selects the M most appropriate transmission beams from among N transmission beams by using the received DL reference signals in step 560. The most appropriate transmission beams may be selected, for example, in an order from the best link channel state measured based on the DL reference signal to the worst link channel state.

The terminal 501 feeds the M transmission beam information back to the base station 503 in step 570. When feeding the transmission beam information back to the base station 503, at the request of the base station 503, the terminal 501 may also feed back to the base station, as additional information, at least one of inter-transmission beam correlation information about correlation between transmission beams and reception beam index information about reception beams which are optimally mapped to the selected M transmission beams, respectively, together with the transmission beam information. The feedback interval of the transmission beam information and the feedback interval of the additional information may be the same as or different from each other.

In another example, when requesting the terminal 501 to feed the M transmission beam information back to the base station 503 in step 510, the base station 503 may instruct the terminal 501 to feed back to the base station 503 the information about the M transmission beams which are most appropriate for a transmission beam diversity transmission mode. The terminal 501 may select the M transmission beams which are appropriate for the transmission beam diversity transmission mode by using at least one of inter-transmission beam correlation information, an inter-transmission beam reception power difference, and information of whether or not indices of reception beams optimally mapped to transmission beams are the same, and may feed the M transmission beam information back to the base station 503.

In another example, when requesting the terminal 501 to feed the M transmission beam information back to the base station 503 in step 510, the base station 503 may instruct the terminal 501 to feed back to the base station 503 the M transmission beam information only for the same reception beams of the terminal 501.

In step 580, the base station 503 selects P (>1) transmission beams to be actually used in data transmission from among the M transmission beams corresponding to the transmission beam information received in step 570 for data transmission using transmission beam diversity. The base station 503 may send a request for CQI information predicted in signal transmission in the transmission beam diversity transmission mode by using the selected P transmission beams in step 590. It is assumed that the base station 503 informs the terminal 501 of the P transmission beam information.

The base station 503 may use the following conditions to determine transmission beam diversity transmission:
 (1) if an inter-transmission beam correlation value is less than a particular value;
 (2) if an inter-transmission beam reception power difference is less than a particular value; and
 (3) if reception beam indices optimally mapped to transmission beams are the same as each other.

The terminal 501 measures a CQI predicted in signal transmission in the transmission beam diversity transmission mode by using the P transmission beams based on the DL reference signals and feeds the measured CQI information back to the base station 503 in step 515. The base station 503 transmits the scheduling assignment message including resource assignment information to the terminal 501 for data transmission using transmission beam diversity in step 525, and transmits the data encoded using the Alamouti scheme to the terminal 501 by using the P transmission beams in step 535. The selected P transmission beams are formed from antennas included in an antenna array, and the data encoded using the Alamouti scheme is transmitted through the antennas included in the antenna array.

Operations of steps 520 through 525 may be periodically performed, and may not be necessarily performed immediately prior to data transmission using transmission beam diversity.

The terminal 501 receives the transmitted data and performs decoding for respective reception beams in step 535. If a magnitude of a signal transmitted through a particular transmission beam in a particular reception beam is less than a particular value, channel estimation is not possible, such that decoding may be performed on the assumption that no symbol is transmitted from the beam. If the data is received as multiple reception beams, the terminal 301 may combine decoding results from the respective reception beams symbol-by-symbol, or may select and combine at least two results from among multiple results. When only one result is selected, the combining process may not be necessary.

While the transmission beam diversity transmission procedure applied to the DL has been described as an example in FIG. 5, the terminal and the transmission beam diversity transmission procedure described in FIG. 5 may also be applied to an UL. For UL, the base station 503 transmits the scheduling assignment message including resource assignment information for data transmission using the transmission beam diversity to the terminal 501 in step 525, and the terminal 501 transmits the data encoded using the Alamouti scheme to the base station 503 by using the P transmission beams based on the P transmission beam information received from the base station 503 in step 535.

Figure 6:
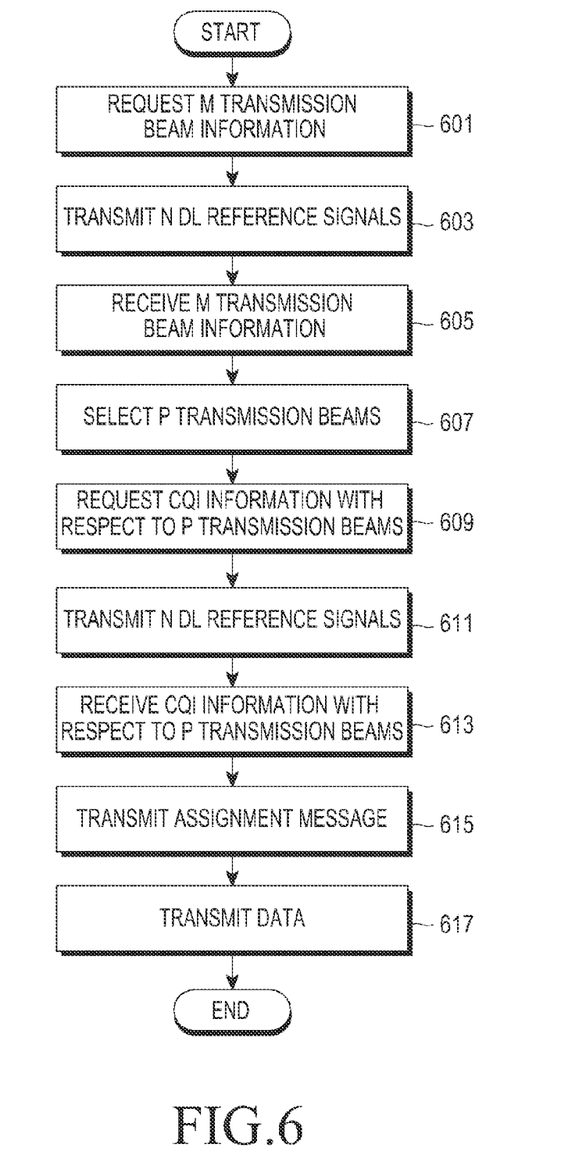
FIG. 6 is a flowchart illustrating an operation sequence of a base station in transmission beam diversity transmission between a terminal and a base station according to an exemplary embodiment of the present invention.

FIG. 6 is a flowchart illustrating an operation sequence of the base station in transmission beam diversity transmission between the terminal and the base station according to an exemplary embodiment of the present invention.

Referring to FIG. 6, a base station sends a request for M transmission beam information to a terminal in step 601, and transmits N DL reference signals to the terminal in step 603.

The base station receives the M transmission beam information fed back from the terminal in step 605. The M transmission beam information refers to information about M transmission beams which are selected by the terminal based on channel states, and may include, for example, a beam index and a beam reception power.

The base station selects P (>1) transmission beams to be actually used for data transmission from among the M transmission beams corresponding to the transmission beam information in step 607. In step 609, the base station sends a request for CQI information predicted in signal transmission in a transmission beam diversity transmission mode by using the selected P transmission beams to the terminal. The base station transmits the N DL reference signals to the terminal in step 611.

In step 613, the base station receives the CQI information with respect to the P transmission beams fed back from the terminal.

In step 615, the base station transmits an assignment message including, for example, the P transmission beam information and resource assignment information to the terminal.

In step 617, the base station transmits data encoded using the Alamouti scheme to the terminal by using the selected P transmission beams.

In FIG. 6, a description has been made, as an example, of the operation of the base station in transmission beam diversity transmission between the terminal and the base station according to an exemplary embodiment of the present invention. However, step 601 may be omitted as in the first exemplary embodiment, and in this case, steps 609 through 613 may also be omitted.

Although not shown in FIG. 6, as in the second exemplary embodiment of the present invention, the base station may request CQI information predicted in signal transmission in the transmission beam diversity transmission mode, together with the M transmission beam information in step 601. In this case, the base station may receive the CQI information measured by the terminal, together with the M transmission beam information in step 605, and steps 607 through 613 may be omitted.

Figure 7:
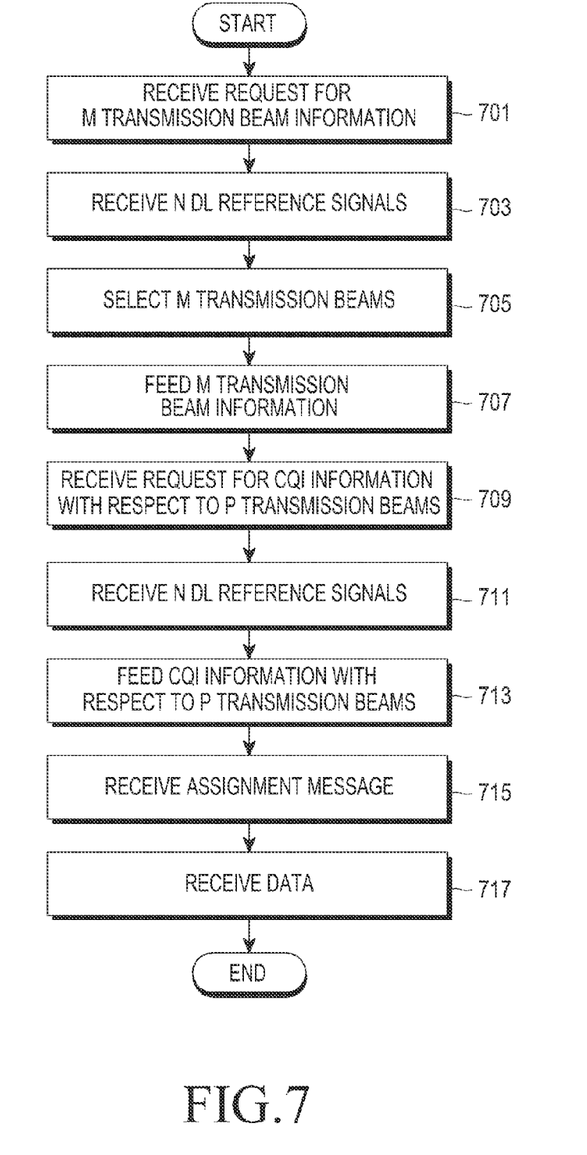
FIG. 7 is a flowchart illustrating an operation sequence of a terminal in transmission beam diversity transmission between the terminal and a base station according to an exemplary embodiment of the present invention.

FIG. 7 is a flowchart illustrating an operation sequence of the terminal in transmission beam diversity transmission between the terminal and the base station according to an exemplary embodiment of the present invention.

Referring to FIG. 7, the terminal receives a request for M transmission beam information from the base station in step 701 and receives N DL reference signals in step 703.

The terminal selects the M most appropriate transmission beams from among N transmission beams by using the received N DL reference signals in step 705. The most appropriate transmission beams may be selected, for example, in an order from the best link channel state measured based on the DL reference signal to the worst link channel state.

In step 707, the terminal feeds the M transmission beam information back to the base station. The transmission beam information may include, for example, a beam index and a beam reception power. Although not shown, the terminal, when feeding the transmission beam information back to the base station, at the request of the base station, the terminal may also feed back to the base station, as additional information, at least one of inter-transmission beam correlation information about correlation between transmission beams and reception beam index information about reception beams which are optimally mapped to the selected M transmission beams, respectively, together with the transmission beam information.

In step 709, the terminal receives, from the base station, a request for CQI information predicted in signal transmission in the transmission beam diversity transmission mode by using P (>1) transmission beams to be actually used for transmission from among the M transmission beams. In step 711, the terminal receives the N DL reference signals.

In step 713, the terminal feeds the CQI information with respect to the P transmission beams back to the base station.

In step 715, the terminal receives an assignment message including, for example, the information about the P transmission beams selected by the base station, and resource assignment information from the base station.

In step 717, the terminal receives data, which is encoded using the Alamouti scheme and transmitted using the P transmission beams, from the base station.

In FIG. 7, a description has been made, as an example, of the operation of the terminal in transmission beam diversity transmission between the terminal and the base station according to a third exemplary embodiment of the present invention. However, step 701 may be omitted as in the first exemplary embodiment, and in this case, steps 709 through 713 may also be omitted.

Although not shown in FIG. 7, as in the second exemplary embodiment of the present invention, the terminal may receive CQI information predicted in signal transmission in the transmission beam diversity transmission mode, together with the M transmission beam information in step 701. In this case, the terminal may feed back to the base station the CQI information measured by the terminal, together with the M transmission beam information in step 707, and steps 709 through 713 may be omitted.

Figure 8A:
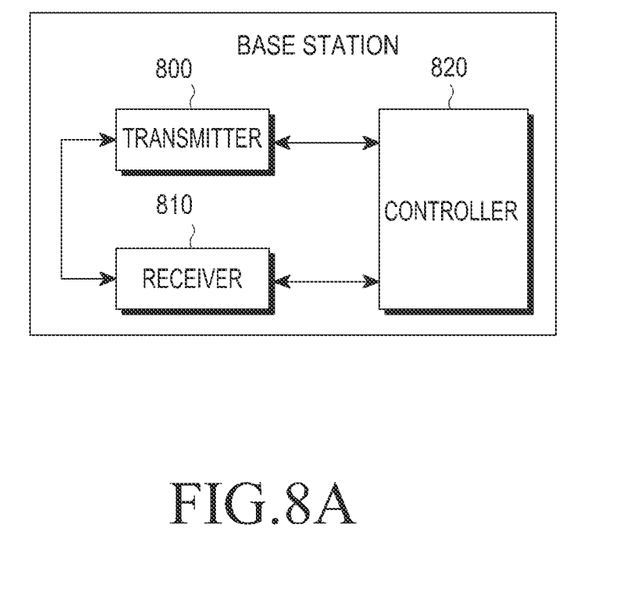
FIG. 8A is a block diagram illustrating a base station for transmission beam diversity transmission between a terminal and the base station according to an exemplary embodiment of the present invention.

FIG. 8A is a block diagram illustrating a base station for transmission beam diversity transmission between a terminal and the base station according to an exemplary embodiment of the present invention.

Referring to FIG. 8A, the base station may include a transmitter 800, a receiver 810, and a controller 820.

The transmitter 800 transmits N DL reference signals to the terminal and the receiver 810 receives M transmission beam information fed back from the terminal. The M transmission beam information refers to information about M transmission beams selected by the terminal based on channel states, and may include, for example, a beam index and a beam reception power. The transmitter 800 may send a request for feeding the M transmission beam information or CQI information predicted in signal transmission in the transmission beam diversity transmission mode to the terminal, before transmitting the N DL reference signals to the terminal The controller 820 selects P (>1) transmission beams to be actually used for data transmission from among the M transmission beams corresponding to the transmission beam information, and generates a assignment message including, for example, the P transmission beam information and resource assignment information and transmits the assignment message to the terminal through the transmitter 800. If the transmitter 800 transmits a request for the M transmission beam information to the terminal, upon selection of the P transmission beams by the controller 820, the transmitter 800 feeds CQI information with respect to the P transmission beams back to the terminal.

The transmitter 800 transmits data encoded using the Alamouti scheme by using the selected P transmission beams.

A process in which the transmitter 800 transmits the data encoded by the Alamouti scheme by using the selected P transmission beams is described below with respect to FIG. 8B.

Figure 8B:
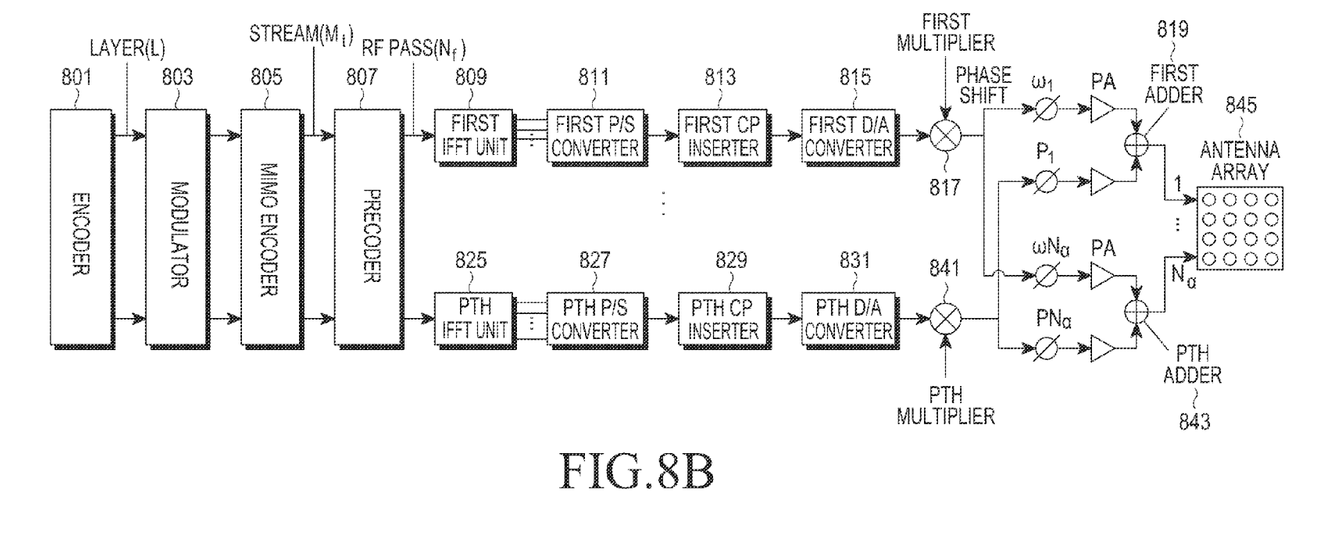
FIG. 8B is a block diagram illustrating a transmitter included in a base station for transmission beam diversity transmission between a terminal and the base station according to an exemplary embodiment of the present invention.

FIG. 8B is a block diagram illustrating the transmitter 800 included in the base station for transmission beam diversity transmission between the terminal and the base station according to an exemplary embodiment of the present invention.

Referring to FIG. 8B, the transmitter 800 of the base station may include an encoder 801, a modulator 803, a Multiple Input Multiple Output (MIMO) encoder 805, a precoder 807, first through $P^{th}$ Inverse Fast Fourier Transform (IFFT) units 809 and 825, first through $P^{th}$ Parallel-to-Serial (P/S) converters 811-827, first through $P^{th}$ Cyclic Prefix (CP) inserters 813-829, first through $P^{th}$ Digital-to-Analog (D/A) converters 815-831, first through $P^{th}$ multipliers 817-841, and first through $P^{th}$ adders 819-843. The structure of the transmitter 800 illustrated in FIG. 8B is merely an example, and may vary according to implementation.

The encoder 801 encodes input bits and outputs them to the modulator 803, and the modulator 803 modulates the input channel-encoded bits and outputs them to the MIMO encoder 805. The MIMO encoder 805 applies an orthogonalization code, such as an Alamouti scheme, to the input modulated symbol, and outputs the result to the precoder 807.

The precoder 807 receives the orthogonal-code applied symbol, performs digital beamforming on the received symbol, and outputs the result to the first through $P^{th}$ IFFT units 809-825, respectively, corresponding to P transmission beams selected by the controller 820 of the base station. The precoder 807 may be omitted if digital beamforming is performed in an analog or Radio Frequency (RF) transmitter.

The first through $P^{th}$ IFFT units 809 and 825 transform the signal on which digital beamforming is performed into a time-domain signal, and the first through $P^{th}$ P/S converters 811-827 convert the parallel signal into a serial signal and output the serial signal to the first through $P^{th}$ CP inserters 813-829.

The first through $P^{th}$ CP inserters 813-829 add a CP to the input serial signal, and the first through $P^{th}$ D/A converters 815-831 convert the CP-added serial signal into an analog signal and output the analog signal to the first through $P^{th}$ multipliers 817-841.

The first through $P^{th}$ multipliers 817-841 multiply each signal input by phase shift by a weight, and the resulting signal passes through a Power Amplifier (PA) and then is transmitted through an antenna array.

Figure 9:
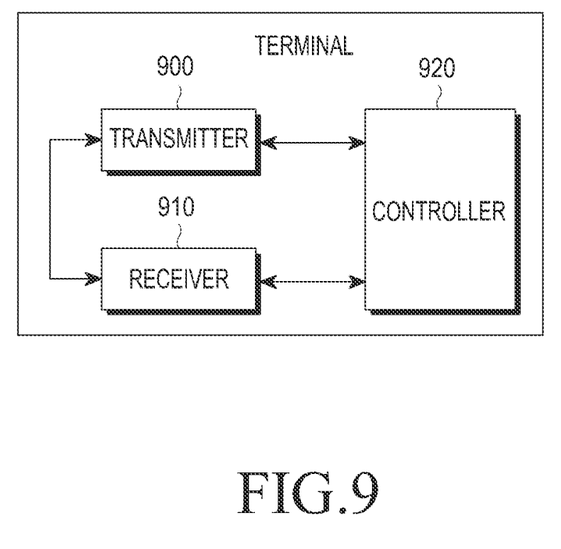
FIG. 9 is a block diagram illustrating a terminal for transmission beam diversity transmission between the terminal and a base station according to an exemplary embodiment of the present invention.

FIG. 9 is a block diagram illustrating a terminal for transmission beam diversity transmission between the terminal and a base station according to an exemplary embodiment of the present invention.

Referring to FIG. 9, the terminal may include a transmitter 900, a receiver 910, and a controller 920. The terminal may also include additional components not shown here for purposes of clarity. These additional components may vary according to a design and implementation of the terminal.

The receiver 910 receives N DL reference signals from the base station, and the controller 720 selects M most appropriate transmission beams from among N transmission beams by using the received N DL reference signals. The most appropriate transmission beams may be selected, for example, in an order from the best link channel state measured based on the DL reference signal to the worst link channel state. The receiver 910 may receive a request for feeding back M transmission beam information or CQI information predicted in signal transmission in the transmission beam diversity transmission mode, from the base station, before receiving the N DL reference signals.

The transmitter 900 feeds the M transmission beam information back to the base station. The transmission beam information may include, for example, a beam index and a beam reception power. When feeding the transmission beam information back to the base station, at the request of the base station, the transmitter 900 may also feed back to the base station, as additional information, at least one of inter-transmission beam correlation information about correlation between transmission beams and reception beam index information about reception beams which are optimally mapped to the selected M transmission beams, respectively, together with the transmission beam information. Once the receiver 910 receives a request for feeding back CQI information with respect to P transmission beams from the base station, the transmitter 900 feeds the CQI information with respect to the P transmission beams back to the base station.

The receiver 910 receives an assignment message including, for example, the information about the P transmission beams selected by the base station and resource assignment information from the base station, and receives data which is encoded by the Alamouti scheme and transmitted using the P transmission beams.

As it is apparent from the foregoing description, when a beamforming method and apparatus for acquiring transmission beam diversity is provided in a wireless communication system, beamforming which is robust against beam change may be applied.

While the invention has been shown and described with reference to certain exemplary embodiments thereof, it will be understood by those skilled in the art that various changes in form and detail may be made therein without departing from the spirit and scope of the invention as defined by the appended claims and their equivalents.

What is claimed is:

1. A data transmission method for a base station to acquire transmission beam diversity in a wireless communication system, the data transmission method comprising:
    transmitting reference signals related to a plurality of transmission beams to a terminal;
    receiving transmission beam information related to transmission beams selected by the terminal among the plurality of transmission beams based on the transmitted reference signals from the terminal;
    selecting at least two transmission beams to be used for data transmission among the selected transmission beams based on the transmission beam information; and
    transmitting data to the terminal by using diversity transmission scheme via the selected at least two transmission beams.

2. The data transmission method of claim 1, further comprising:
    transmitting a request for the transmission beam information related to the selected transmission beams to the terminal;
    transmitting a request for channel quality information predicted in the data transmission for the selected at least two transmission beams to the terminal; and
    receiving the channel quality information from the terminal.

3. The data transmission method of claim 1, further comprising:
    transmitting a request for the transmission beam information related to the selected transmission beams and channel quality information predicted in the data transmission for the selected transmission beams to the terminal;
    receiving the channel quality information from the terminal; and
    transmitting the data to the terminal by using the diversity transmission scheme via the selected transmission beams based on the transmission beam information.

4. The data transmission method of claim 1, wherein if an inter-transmission beam correlation value is less than a predetermined value, if an inter-transmission beam reception power difference is less than a particular value, or if transmission beam index and reception beam index optimally mapped to transmission beam are the same, the data is transmitted via the selected at least two transmission beams.

5. The data transmission method of claim 1, wherein the transmission beam information comprises at least one of a beam index, a beam reception power, a reception beam index mapped to each of the multiple transmission beams, and an inter-transmission beam correlation value.

6. The data transmission method of claim 1, further comprising:
transmitting a scheduling assignment message to the terminal,
wherein the scheduling assignment message includes at least one of information about the selected at least two transmission beams and resource assignment information.

7. The data transmission method of claim 1, wherein the diversity transmission scheme comprises at least one of a space-time block code (STBC) scheme and a space-frequency block code (SFBC) scheme.

8. A data reception method for a terminal to acquire transmission beam diversity in a wireless communication system, the data reception method comprising:
receiving reference signals related to a plurality of transmission beams from a base station;
selecting transmission beams among the plurality of transmission beams based on the received reference signal;
transmitting transmission beam information related to the selected transmission beams to the base station; and
receiving data, which is transmitted by using diversity transmission scheme via at least two transmission beams among the selected transmission beams, from the base station.

9. The data reception method of claim 8, further comprising:
receiving a request for the transmission beam information related to the selected transmission beams from the base station;
receiving a request for channel quality information predicted in data transmission for the at least two transmission beams from the base station; and
measuring the channel quality information and transmitting the measured channel quality information to the base station.

10. The data reception method of claim 8, further comprising:
receiving a request for the transmission beam information related to the selected transmission beams and the channel quality information predicted in the data transmission for the selected transmission beams from the base station;
measuring the channel quality information and transmitting the measured channel quality information to the base station; and
receiving data, which is transmitted by using the diversity transmission scheme via the selected transmission beams based on the transmission beam information, from the base station.

11. The data reception method of claim 8, wherein if the data is received through multiple reception beams, at least two decoding results in the respective reception beam are selected and combined symbol-by-symbol or one of the decoding results is selected.

12. The data reception method of claim 8, wherein the transmission beam information comprises at least one of a beam index, a beam reception power, a reception beam index mapped to each of the multiple transmission beams, and an inter-transmission beam correlation value.

13. The data reception method of claim 8, further comprising:
receiving a plurality of reference signals related to a plurality of transmission beams; and
selecting the multiple transmission beams among the plurality of transmission beams.

14. The data reception method of claim 8, wherein the diversity transmission scheme comprises at least one of a space-time block code (STBC) scheme and a space-frequency block code (SFBC) scheme.

15. A base station for acquiring transmission beam diversity in a wireless communication system, the base station comprising:
a transmitter configured to transmit reference signals related to a plurality of transmission beams to a terminal;
a receiver configured to receive transmission beam information related to transmission beams selected by the terminal among the plurality of transmission beams based on the transmitted reference signals from the terminal; and
a controller configured to select at least two transmission beams to be used for data transmission among the selected transmission beams based on the transmission beam information;
wherein the transmitter is further configured to transmit data to the terminal by using diversity transmission scheme via the selected at least two transmission beams.

16. The base station of claim 15, wherein the transmitter is further configured to transmit a request for the transmission beam information related to the multiple transmission beams to the terminal and to transmit a request for channel quality information predicted in the data transmission for the selected at least two transmission beams to the terminal, and
wherein the receiver is further configured to receive the channel quality information from the terminal.

17. The base station of claim 15, wherein the transmitter is further configured to transmit a request for the transmission beam information related to the selected multiple transmission beams and channel quality information predicted in the data transmission for the selected transmission beams to the terminal and to transmit the data to the terminal by using the diversity transmission scheme via the selected transmission beams based on the transmission beam information, and
wherein the receiver is further configured to receive the channel quality information from the terminal.

18. The base station of claim 15, wherein if an inter-transmission beam correlation value is less than a predetermined value, if an inter-transmission beam reception power difference is less than a particular value, or if transmission beam index and reception beam index optimally mapped to the transmission beam are the same, the transmitter is further configured to transmit the data via the selected at least two transmission beams.

19. The base station of claim 15, wherein the transmission beam information comprises at least one of a beam index, a beam reception power, a reception beam index mapped to each of the multiple transmission beams, and an inter-transmission beam correlation value.

20. The base station of claim 15, wherein the transmitter is further configured to transmit a scheduling assignment message to the terminal, and wherein the scheduling assignment message includes at least one of information about the selected at least two transmission beams and resource assignment information.

21. The base station of claim 15, wherein the diversity transmission scheme comprises at least one of a space-time block code (STBC) scheme and a space-frequency block code (SFBC) scheme.

22. A terminal for acquiring transmission beam diversity in a wireless communication system, the terminal comprising:
   a receiver configured to receive reference signals related to a plurality of transmission beams from a base station;
   a controller configured to select transmission beams among the plurality of transmission beams based on the received reference signal; and
   a transmitter configured to transmit transmission beam information related to the selected transmission beams to the base station;
   wherein the receiver is further configured to receive data, which is transmitted by using diversity transmission scheme via at least two transmission beams among the selected transmission beams, from the base station.

23. The terminal of claim 22, wherein the receiver is further configured to receive a request for the transmission beam information related to the selected transmission beams from the base station and to receive a request for channel quality information predicted in data transmission for the at least two transmission beams from the base station, and
   wherein the transmitter is further configured to measure the channel quality information and to transmit the measured channel quality information to the base station.

24. The terminal of claim 22, wherein the receiver is further configured to receive a request for the transmission beam information related to the selected multiple transmission beams and the channel quality information predicted in the data transmission for the selected transmission beams from the base station and to receive data, which is transmitted by using the diversity transmission scheme via the selected transmission beams based on the transmission beam information, from the base station, and
   wherein the transmitter is further configured to measures the channel quality information and to transit the measured channel quality information to the base station.

25. The terminal of claim 22, further comprising a controller configured to select at least two of decoding results in the respective reception beam and combining the selected at least two decoding results symbol-by-symbol or to select one of the decoding results, if receiving the data through multiple reception beams.

26. The terminal of claim 22, wherein the transmission beam information comprises at least one of a beam index, a beam reception power, a reception beam index mapped to each of the multiple transmission beams, and an inter-transmission beam correlation value.

27. The terminal of claim 22, wherein the receiver is further configured to receive a plurality of reference signals related to a plurality of transmission beams, and
   wherein the terminal further comprises a controller configured to select the multiple transmission beams among the plurality of transmission beams.

28. The terminal of claim 22, wherein the diversity transmission scheme comprises at least one of a space-time block code (STBC) scheme and a space-frequency block code (SFBC) scheme.

* * * * *